United States Patent [19]

Pouwer et al.

[11] Patent Number: 5,232,630
[45] Date of Patent: Aug. 3, 1993

[54] METHOD OF MANUFACTURING CONDUCTIVE HETEROCYCLIC POLYMERS BY REACTING NEW POLYMERIC INTERMEDIATE PRODUCTS WITH $NH_3$, A $NH_3$ PRODUCING SUBSTANCE, $P_2S_5$ OR LAWESSON'S REAGENT

[75] Inventors: Kornelis L. Pouwer; Ton R. Vries, both of Groningen; Egbert W. Meijer; Edsko E. Havinga, both of Eindhoven; Hans Wijnberg, Haren, all of Netherlands

[73] Assignee: U.S. Philips Corporation, New York, N.Y.

[21] Appl. No.: 339,439

[22] Filed: Apr. 17, 1989

[30] Foreign Application Priority Data

Apr. 21, 1988 [NL] Netherlands ............... 8801031

[51] Int. Cl.$^5$ ............... H01B 1/12; C08G 12/00; C08G 75/00
[52] U.S. Cl. ............... 252/500; 252/518; 525/471; 528/226; 528/229
[58] Field of Search ............... 252/500, 518; 525/471; 528/226, 229

[56] References Cited

U.S. PATENT DOCUMENTS 4,876,361  10/1989  Czogalla ............... 549/41
4,886,625  12/1989  Albarella et al. ............... 252/500

*Primary Examiner*—Christine Skane
*Assistant Examiner*—Bradley A. Swope
*Attorney, Agent, or Firm*—Norman N. Spain

[57] ABSTRACT

The polymers are prepared by using the new intermediate product which forms a polymeric precursor, and which is converted into the desired heterocyclic polymer by ring closure.

3 Claims, No Drawings

METHOD OF MANUFACTURING CONDUCTIVE HETEROCYCLIC POLYMERS BY REACTING NEW POLYMERIC INTERMEDIATE PRODUCTS WITH NH₃, A NH₃ PRODUCING SUBSTANCE, P₂S₅ OR LAWESSON'S REAGENT

The invention relates to a method of preparing electrically conductive heterocyclic polymers comprising a thiophene ring or a pyrrole ring.

Polypyrrole, polythiophene and polyphenylenethiophene are well-known, electrically conductive heterocyclic polymers. The electrically conductive character can be attained by treating (doping) the customarily manufactured polypyrrole, polythiophene or polyphenylenethiophene with $I_2$, mostly in the gas phase at for example 100° C., or with $AsF_5$. As a result hereof, electrons are extracted from the polymer which, hence, forms a polymer cation, the $J_{-3}$ ion or the $AsF_{-6}$ ion, which is also formed in this process, being the counterion which is bonded to the polymer cation.

The well-known methods of preparing polypyrrole, polythiophene and polyphenylenethiophene are all based on the coupling of monomers in which the thiophene ring, the pyrrole ring and the phenyl ring is already present.

For example, polyphenylenethiophene is manufactured by subjecting 2,5-dibromothiophene and 1,4-dibromobenzene to Grignard coupling as is known from, for example, Die Macromol. Chemie, Rapid Commun. 6, p. 679 (1985). Polythiophene can alternatively be manufactured by subjecting 2,5-dibromothiophene Grignard coupling, as described in Synthetic Metals 9, p. 77 (1984). Polythiophene and polypyrrole are mostly prepared by electrochemical oxidation, in which at the anode the monomer molecules are converted by oxidation into the corresponding cations which are coupled to each other. By means of chemical oxidation using, for example, $FeCl_3$ it is alternatively possible to convert the molecules of the monomer, such as pyrrole molecules, into cations which are subsequently coupled to form the polypyrrole molecules. The polymer formed in these oxidation processes already has a conductive character.

The well-known methods have the disadvantage that at a relatively limited chain length of, for example, approximately 20 monomer units the products formed can no longer be dissolved in the reaction medium and, consequently, are separated, so that further polymerization into longer chains is prevented. Consequently, the length of the conjugated system present in the molecule is relatively short so that the electric conductivity is not optimal. In addition, the conjugated system must not be interrupted by faults sometimes occurring in the electrochemical method.

It is an object of the invention to provide a new method of manufacturing electrically conductive heterocyclic polymers, by means of which longer molecular chains and hence an improved electric conductivity can be obtained.

A further object of the invention is to provide a method which is suitable for general use and by means of which a wide composition range of heterocyclic polymers comprising a thiophene or pyrrole ring can be manufactured.

According to the invention, these objects are achieved by means of a method which is essentially characterized by the formation of a polymeric precursor comprising keto groups, which is converted into the desired heterocyclic thiophene polymer or pyrrole polymer by ring closure, which polymer is subsequently rendered electrically conductive in a customary manner by means of doping. Thus, the formation of the heterocyclic ring takes place in the polymeric phase, which is in contrast with the methods known so far, in which, as described hereinbefore, the monomer used already comprises the intended heterocyclic ring.

The invention relates more particularly to a method of the type described above, which is characterized in that polymers are manufactured which correspond to the formula

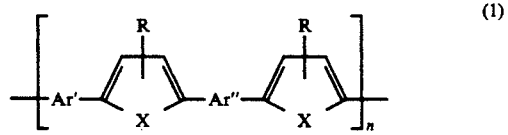

wherein
Ar' and Ar" both represent an aromatic group, which aromatic groups are the same or different,
R is a hydrogen atom or an alkyl group having 1–10 C-atoms,
X is a sulphur atom or the group —NH—
n is larger than or equal to 25,
by reacting a compound of the formula

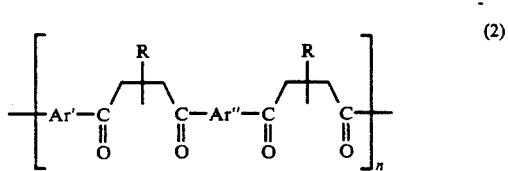

wherein Ar', Ar", R and n have the above-stated meaning, with
a) $NH_3$ or a $NH_3$-producing substance, to obtain a compound of the formula

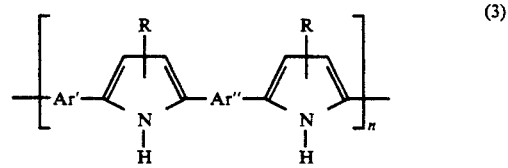

wherein Ar', Ar, R and n have the above-stated meaning, or
b) a sulphur-phosphor compound, to obtain a compound of the formula

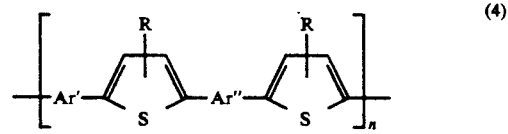

wherein Ar', Ar", R and n have the above-stated meaning.

This method can be explained as follows. ad. a:

The reaction is preferably carried out using $NH_3$ gas at a raised temperature of, for example, 150°–250° C. The best results are obtained at 250° C. It is also possible to apply an increased pressure. For this purpose, a reaction vessel comprising the compound of formula (2) is accommodated in an autoclave and NH₃ is introduced at a pressure of, for example, 5-20 bar.

The reaction indicated under a can also be carried out using an NH₃ producing substance such as an ammonium salt.

Preferably, liquid ammonium acetate is used or a solution of ammonium acetate in an inert organic solvent such as dimethyl formamide (DMF). The reaction in which liquid ammonium acetate is used is carried out in an inert gas atmosphere of, for example, N₂ at a raised temperature of, for example, 125° C. The reaction in which the solution of ammonium acetate is used is also carried out in an inert gas atmosphere at the reflux temperature of the solvent used. ad. b The reaction indicated under b is preferably carried out at a raised temperature and in the presence of a solvent. Very suitable sulphur-phosphor compounds are P₂S₅ and Lawessons reagent. This reagent (LR) has the formula:

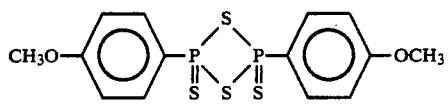

(6)

Suitable inert organic solvents are, for example, aliphatic and aromatic hydrocarbons which may be chlorated and ethers. Preferably, the reaction temperature is 150°-250° C. because at these relatively high temperatures the best degree of conversion is obtained. Preferably, the boiling temperature of the solvent is as high as possible. A suitable solvent is, in particular, O-dichlorobenzene having a boiling point of 180° C.

In the above-stated formulae Ar' and Ar" are an aromatic group. The choice of the aromatic group is not restricted within narrow limits. Examples of suitable aromatic groups are benzene, anthracene, pyridine, thiophene and pyrrole. These groups may be substituted by one or more halogen atoms, alkyl groups and aryl groups. The value of n is equal to or larger than 25. There is no clear maximum value of n. In general the value of n is smaller than 2500. A suitable value is $25 \leq n \leq 100$.

New, electrically conductive polymers can be manufactured by using the method according to the invention.

The invention also relates to such new polymers or polymeric compounds which correspond to the formula

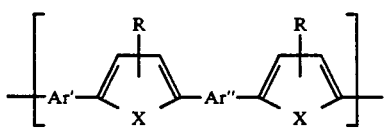

(1)

wherein Ar', Ar", R, X and n have the above-stated meaning, and if X is a —NH-group and R is a H-atom, Ar' and Ar" do not both represent a pyrrole group, and if X is a —S-atom and R is a H atom, Ar' and Ar" do not both represent a thiophene group or a phenyl group.

Suitable electrically conductive polymers are, in particular, the polymers of formula (1), wherein Ar' and Ar" both have the same meaning and represent a phenyl group, a pyrrole group, a thiophene group or a pyridine group, and wherein R is a hydrogen atom, with the proviso that if Ar' and Ar" both are a thiophene or a phenyl group, X is a —NH—group, and if Ar' and Ar" both are a pyrrole group, X is a —S— atom.

A very interesting new compound is polyphenylenepyrrole, which comprises 25-100 monomer units per molecule.

The new polymers according to the invention can be prepared by means of the method mentioned hereinbefore. The intermediate product used in the method according to the invention is new. This intermediate product is important because by further conversions the interesting electrically conductive polymers can be manufactured from this product.

The invention also relates to the new intermediate product which corresponds to the formula

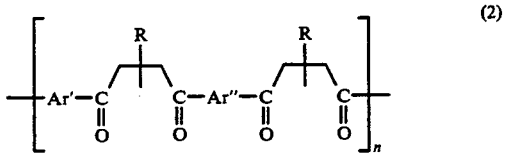

(2)

wherein Ar', Ar", R and n have the above-stated meaning.

Interesting intermediate products are in particular the compounds of formula (2), wherein Ar' and Ar" have the same meaning and represent a phenyl group, pyrrole group, thiophene group or a pyridene group, and R is a hydrogen atom.

The polymers of formula (2) are manufactured according to a new polymerization method. This new polymerization process also forms part of the present invention.

The invention more particularly relates to a method of manufacturing a polymeric substance which corresponds to the formula

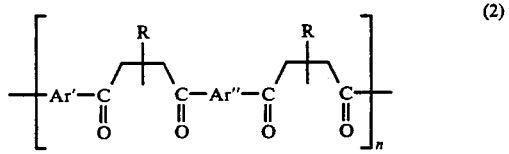

(2)

wherein Ar', Ar", R and n have the above-stated meaning, and which is characterized in that a compound of the formula

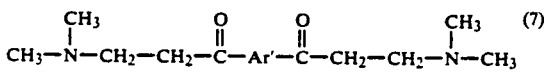

(7)

is made to react with a compound of the formula

(8)

thereby forming a polymer of formula (2), wherein R is a hydrogen atom. If desired, this polymeric compound is alkylated into a compound of formula (2) wherein R is an alkyl group.

The above-stated reaction is carried out in a solvent such as dimethyl formamide and in the presence of a catalytic quantity of a cyanide, in particular NaCN. The alkylation process proceeds smoothly, for example, by making the compound to be alkylated react with a mixture of KOH, dimethyl sulphoxide and an alkyl halide (alkyl chloride, alkyl bromide or alkiodide). The reaction is carried out at a temperature which increases from room temperature to approximately 150° C. After cooling, the reaction mixture is introduced in water and the alkylated compound obtained isisolated by filtration.

One alkyl group is introduced into the unit

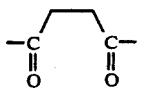

to be alkylated.

The compound of the following formula (7) is manufactured according to the reaction scheme

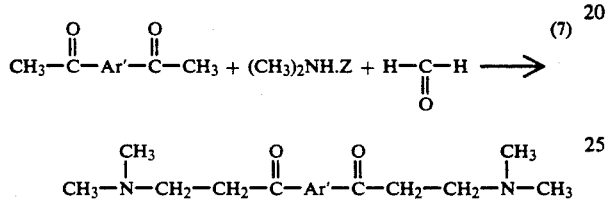

wherein Z is an inorganic acid such as HCl.

The reaction is carried out at an increased temperature in the presence of a solvent such as an alcohol and in the presence of an acid such as HCl. The amine according to formula (7) is liberated from the salt form (such as HCl salt) obtained by treating the substance with ammonia and then extracting it using a chlorated hydrocarbon.

The heterocyclic polymers manufactured according to the invention are doped in a customary manner with iodine (at 100° C., in the gas phase) or with AsF$_5$, as has been stated above, and exhibit an electric conductivity which is many orders of magnitude larger, than that of a similar compound which is manufactured in known manner. This means that the polymers manufactured according to the method of the invention have a larger conjugated system. This again emphasizes the importance of the intermediate product of formula (2). The size of the conjugated system of the electrically conductive polymer ultimately obtained is directly dependent on the solubility of the said intermediate product. The solubility can be influenced and, hence, a substantial solubility can be obtained, by the selection of the groups of Ar', Ar", R present in the intermediate product and the incorporation of other groups.

The electrically conductive heterocyclic polymers obtained according to the present invention can be used advantageously as electric conductors in electromagnetic shielding systems, conductive paints, electrodes, cables, conductive adhesives and oils and fuses as well as semiconductors in transistors and solar cells.

The invention will now be explained in greater detail by means of the exemplary embodiment.

EXEMPLARY EMBODIMENT

1. Preparation of p-bis (3-dimethylaminopropane-1-on) benzene having the formula

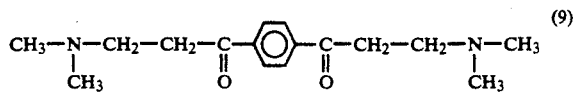

A solution of 10.0 g (0.062 mol) p-diacethylbenzene, 11.1 g (0.136 mol) dimethylaminehydrochloride, 13 ml formaldehyde (0.15 mol) and 4 ml of concentrated HCl in 40 ml ethanol is refluxed for several hours. The solid obtained after cooling is separated and recrystallized several times in ethanol water.

As a result hereof, 9.8 g of HCl salt of the above-stated compound is obtained. The free amine was obtained by stirring the HCl salt into a 25% NH$_4$OH solution and, subsequently, extracting it using CH$_2$Cl$_2$. After drying and evaporation a solid white substance was obtained having a melting point of 85°-87° C.

2. Preparation of poly (1-p-phenyl 1,4-butanedione) of the formula

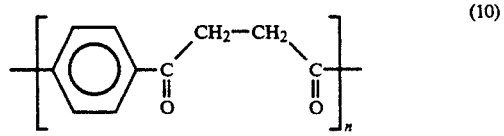

A small quantity of NaCN is added to 5.95 g (21.5 mmol) of the product obtained according to 1, which is dissolved in 80 ml of dimethyl formamide. A solution of 2.89 g (21.5 mmol) of terephtaldehyde in 20 ml dimethyl formamide is added to this solution. After stirring for some time, 50 ml of dimethyl formamide is added to the viscous solution, after which the whole mixture is stirred again at 50°-60° C. A sediment is formed. The reaction mixture is pured out in water and filtered off. The yellow solid is successively washed with water, CH$_2$Cl$_2$ and ether. After drying, 5.0 g (81%) of polymer of the formula shown above is obtained.

Melting point >212° C.

3. The preparation of poly (p-phenylene-2.5-pyrrole) having the formula

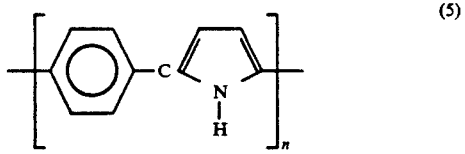

(a) Using liquid ammonium acetate.

A suspension of 1 g of the poly (1-p-phenyl-1,4-butanedione) according to 2 in 20 g of NH$_4$OAc is stirred for some time at 125° C. The reaction mixture is pured out in water, filtered off and washed with water. The IR spectrum of the solid, brown substance obtained is measured and is found to correspond to the above-stated compound.

(b) Using ammonium acetate in dimethyl formamide.

A mixture of 1.7 g of poly (1-p-phenyl-1,4-butanedione) and 20 g of NH$_4$OAc is dissolved in 100 ml of dimethyl formamide and refluxed for some time. After the mixture is pour out in water the solid, brown substance is filtered off and washed with water. The IR spectrum corresponds to the above-stated poly (p-phenylene-2,5-pyrrole).

(c) Using ammonium acetate in acetic acid.

A mixture of 1 g of poly (1-p-phenyl-1,4-butanedione) and 20 g of NH₄OAc in 100 ml of acetic acid is refluxed for some time. After the mixture is poured out in water the solid obtained is filtered off and washed with water. The IR spectrum corresponds to poly (p-phenylene-2,5-pyrrole).

(d) Using $NH_3$ in an autoclave.

A test tube comprising 1 g of poly (1-p-phenyl-1,4-butanedione) is introduced into an autoclave. $NH_3$ gas is introduced into the autoclave. The pressure in the autoclave is 9 bar. The temperature is 250° C.

After several hours the autoclave is cooled and the test tube is removed from the autoclave. The brown solid obtained is analysed by means of, inter alia, measuring the IR spectrum. The analysis corresponds to poly (p-phenylene-2,5-pyrrole).

4. The preparation of poly (p-phenylene-2,5-thiophene) having the formula

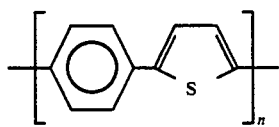
(11)

2 g of Lawessons reagent is added to a solution of 1.0 g of poly (1-p-phenyl-1,4-butanedione) in 30 ml of 0-dichlorobenzene. The solution is refluxed for some time and subsequently cooled. The solid obtained is stirred into a 20% NaOH solution, filtered off and, in succession, washed with water, $CHCl_3$ and acetone. The dark-coloured solid is analysed, inter alia, by measuring the IR spectrum. The analysis corresponds to the compound of the above-stated formula.

The poly (p-phenylene-2,5-pyrrole) prepared according to the above-described example 3, as well as the poly (p-phenylene-2,5-thiophene) according to example 4 are treated with iodine at 100° C. in the gas phase.

The electric conductivity of the polymers which have been doped with $I_2$ in the above described manner is determined. For poly (p-phenylene-2,5-pyrrole) the conductivity amounts to $1.4 \times 10^{-1}$ Scm$^{-1}$.

For the compound poly (p-phenylene-2,5-thiophene) the electric conductivity is $2.5 \times 10^{-2}$ Scm$^{-1}$.

Poly (p-phenylene-2,5-thiophene) is a compound which is known per se. If this substance is manufactured according to the well-known Grignard coupling method and doped with $J_2$, it has an electric conductivity of $4.10^{-5}$ Scm$^{-1}$. Consequently, the poly (p-phenylene-2,5-thiophene) prepared according to the inventive method has a much improved electric conductivity which exceeds that of the substance manufactured in the known manner by a factor of 600.

The heterocyclic polymers of the formulae shown below are manufactured in a manner which corresponds to that described in the above-stated examples 1-4:

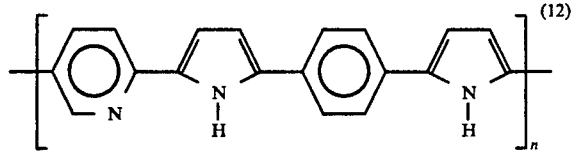
(12)

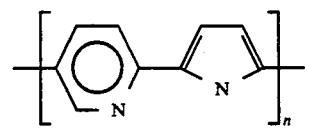
(13)

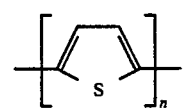
(14)

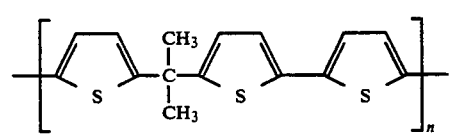
(15)

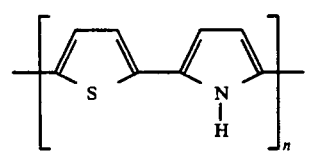
(16)

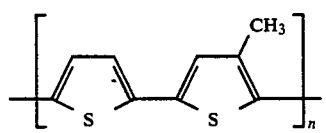
(17)

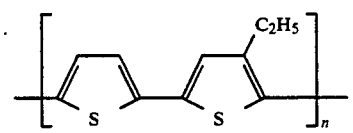
(18)

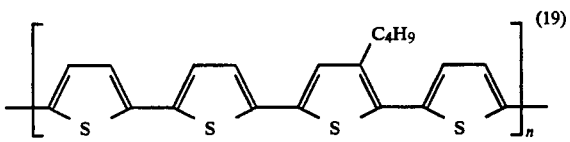
(19)

We claim:

1. A method of manufacturing electrically conductive heterocyclic polymers comprising a thiophene or pyrrole ring and corresponding to the formula

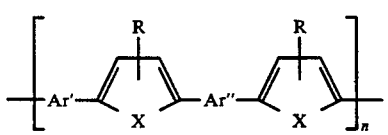
(1)

wherein Ar' and Ar'' both represent an aromatic group, which groups are the same or different, R is a hydrogen atom or an alkyl group having 1-10 C atoms, X is a sulphur atom or the group —NH, and n is larger than or equal to 25, comprising reacting a compound of the formula

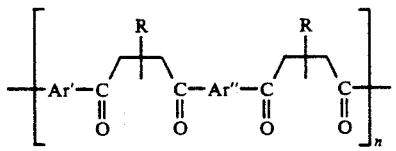

(2)

wherein Ar', Ar", R and n have the above-stated meaning, with a) NH$_3$ or a NH$_3$-producing substance, to obtain a polymer of the formula

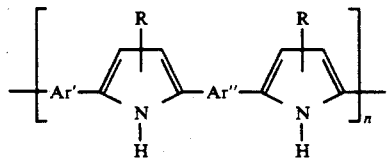

(3)

wherein Ar', Ar", R and n have the above-stated meaning, or b) a sulphur-phosphor compound selected from the group consisting of P$_2$S$_5$ and the Lawesson's reagent, to obtain a polymer of the formula

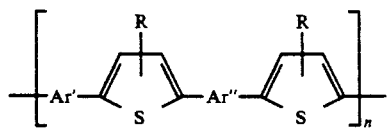

(4)

wherein Ar', Ar", R and n have the above-stated meaning and doping said polymer to render said polymer electrically conducting.

2. A method as claimed in claim 1, characterized in that the reaction is carried out at temperature of 150°–250° C. and using NH$_3$ or ammonium acetate, to which an inert solvent may be added, a polymer of formula (3) being formed.

3. A method as claimed in claim 1, characterized in that the reaction at temperature of 150°–250° C. and in the presence of a solvent is carried out using phosphoric sulphide or a Lawessons reagent, a polymer of formula (4) being formed.

* * * * *